(12) United States Patent
Koch et al.

(10) Patent No.: US 9,322,351 B2
(45) Date of Patent: Apr. 26, 2016

(54) METHOD FOR OPERATING AN INTERNAL COMBUSTION ENGINE WITH AN EMISSION CONTROL SYSTEM

(75) Inventors: Thomas Koch, Boeblingen (DE); Alexander Massner, Esslingen (DE); Anke Traebert, Stuttgart (DE)

(73) Assignee: Daimler AG, Stuttgart (DE)

( * ) Notice: Subject to any disclaimer, the term of this patent is extended or adjusted under 35 U.S.C. 154(b) by 1283 days.

(21) Appl. No.: 13/148,060

(22) PCT Filed: Jan. 26, 2010

(86) PCT No.: PCT/EP2010/000428
§ 371 (c)(1),
(2), (4) Date: Sep. 21, 2011

(87) PCT Pub. No.: WO2010/089038
PCT Pub. Date: Aug. 12, 2010

(65) Prior Publication Data
US 2012/0004833 A1    Jan. 5, 2012

(30) Foreign Application Priority Data
Feb. 6, 2009  (DE) .................. 10 2009 007 764

(51) Int. Cl.
*B60T 7/12*     (2006.01)
*G05D 1/00*     (2006.01)
(Continued)

(52) U.S. Cl.
CPC ............ *F02D 41/024* (2013.01); *F02D 41/064* (2013.01); *F02D 41/403* (2013.01); *F01N 2250/12* (2013.01); *Y02T 10/26* (2013.01); *Y02T 10/44* (2013.01)

(58) Field of Classification Search
CPC .............. F01N 13/009; F01N 2250/12; F01N 2240/02; F01N 3/0835; F01N 3/0814; F01N 3/20; F01N 3/0871; F01N 3/2006; B01D 53/944
USPC .......... 60/274, 285, 286; 423/213.2; 701/101, 701/102, 103, 104
See application file for complete search history.

(56) References Cited

U.S. PATENT DOCUMENTS 6,209,313 B1    4/2001    Wissler et al.
6,725,836 B1    4/2004    Boerkel
(Continued)

FOREIGN PATENT DOCUMENTS

DE    197 49 400 A1    5/1999
EP    1 400 664 A1    3/2004
(Continued)

OTHER PUBLICATIONS

Russian-language Office Action dated Dec. 3, 2012 (Eleven (11) pages).
(Continued)

*Primary Examiner* — Stephen K Cronin
*Assistant Examiner* — Sizo Vilakazi
(74) *Attorney, Agent, or Firm* — Crowell & Moring LLP (57) ABSTRACT

A method for operating an internal combustion engine comprising an emission control system that includes at least one catalytic and/or filter-effective emission control component. In conjunction with a cold start and/or a warm-up of the internal combustion engine, the internal combustion engine is operated using a cold start engine operation process having predefined values for predefined operating parameters of the internal combustion engine. An amount of hydrocarbons (HC) stored in one or more of the at least one emission control component is estimated, and the cold start engine operation process is activated when the estimation indicates that the amount of stored HC exceeds a predefined maximum amount of stored HC.

20 Claims, 2 Drawing Sheets

(51) Int. Cl.
  *G06F 7/00* (2006.01)
  *G06F 17/00* (2006.01)
  *F02D 41/02* (2006.01)
  *F02D 41/06* (2006.01)
  *F02D 41/40* (2006.01)

(56) References Cited

U.S. PATENT DOCUMENTS

| | | | |
|---|---|---|---|
| 6,854,263 | B1 | 2/2005 | Brueck et al. |
| 7,115,237 | B2 | 10/2006 | Sato et al. |
| 8,281,571 | B2 * | 10/2012 | Girbach ................ F01N 3/0253 60/274 |
| 2003/0098012 | A1 | 5/2003 | Wild et al. |
| 2004/0105801 | A1 * | 6/2004 | Sato ..................... B01D 53/944 423/212 |
| 2005/0022513 | A1 * | 2/2005 | Kitahara ............... F01N 3/0814 60/285 |
| 2008/0163610 | A1 * | 7/2008 | Baird ................... F01N 3/0842 60/295 |
| 2010/0192544 | A1 | 8/2010 | Tsujimoto |
| 2011/0146246 | A1 * | 6/2011 | Farman ................ F01N 3/0235 60/286 |

FOREIGN PATENT DOCUMENTS

| | | |
|---|---|---|
| EP | 1 471 219 A1 | 10/2004 |
| EP | 2 009 268 A1 | 12/2008 |
| FR | 2 812 687 A1 | 2/2002 |
| JP | 6-229234 A | 8/1994 |
| JP | 10-274086 A | 10/1998 |
| JP | 2003-155913 A | 5/2003 |
| JP | 2003155913 A * | 5/2003 ................ F01N 3/02 |
| JP | 2004-108320 A | 4/2004 |
| JP | 2004-324566 A | 11/2004 |
| JP | 2005-48747 A | 2/2005 |
| JP | 2005-155330 A | 6/2005 |
| JP | 2006-250120 A | 9/2006 |
| JP | 2008-121555 A | 5/2008 |
| RU | 2 191 270 C2 | 10/2002 |
| RU | 2 264 548 C2 | 11/2005 |
| RU | 2 270 928 C2 | 2/2006 |
| RU | 2 313 870 C1 | 12/2007 |
| WO | WO 2009/008540 A1 | 1/2009 |

OTHER PUBLICATIONS

Japanese-language Office Action dated Jan. 30, 2013 (Six (6) pages).
International Search Report with English translation dated May 12, 2010 (six (6) pages).
Form PCT/ISA/237 (seven (7) pages).
Japanese Office Action dated Jan. 7, 2014 (three (3) pages).

* cited by examiner

METHOD FOR OPERATING AN INTERNAL COMBUSTION ENGINE WITH AN EMISSION CONTROL SYSTEM

BACKGROUND AND SUMMARY OF THE INVENTION

The invention relates to a method for operating an internal combustion engine with an emission control system with at least one catalytic and/or filter-effective emission control component.

Internal combustion engines having an emission control system with a catalytic and/or filter-effective emission control component, generally require that it reaches its operating temperature as quickly as possible. It is, for example, suggested in German Patent document DE 197 49 400 A1 to determine an efficiency for an SCR catalyst and to change certain internal combustion engine operation variables when it falls below a predetermined value in such a manner that the exhaust gas temperature is increased. However, heating of the emission control system, particularly in connection with a cold start or warm-up of the internal combustion engine, can result in an undesired smoke emission, particularly a white smoke emission.

Exemplary embodiments of the present invention provide a method for operating an internal combustion engine with an emission control system with a catalytic and/or filter-effective emission control component, where an emission of smoke to the environment, particularly of white smoke and particularly in connection with a cold start or a warm-up of the internal combustion engine, is reliably limited to tolerable low values.

With the method for operating an internal combustion engine having an emission control system according to the invention with at least one catalytic and/or filter-effective emission control component, an estimate of an HC storage amount of hydrocarbons (HC) stored in one or several of the at least one emission control component takes place and a cold start engine operation method with predefined internal combustion engine operation variables is activated, if the estimate results in the HC storage amount exceeding a predefined HC storage amount limit value. HC are hereby meant to be hydrocarbons, wherein an amount or concentration determination for better comparability can be standardized to a certain hydrocarbon compound, as for example methane or hexane. Emission control components in the sense of the invention are meant to be exhaust gas catalysts such as oxidation catalysts, nitrogen oxide storage catalysts, SCR catalysts or catalytically coated or uncoated particle filters.

The specific cold start engine operation method provided for the case of an HC storage amount exceeding the HC storage amount limit value is preferably not used or is used at the most in a changed form, if, or as long as it is below the HC storage amount limit value. An excess fuel consumption can be avoided thereby, which typically adjusts with the provided specific cold start engine operation method, if this is not necessary from the view of the undesired smoke or white smoke emission.

The inventors have recognized that an undesirably high smoke or white smoke emission is caused in the first instance by a too large amount of HC adsorbed in one or several emission control components of the emission control system. It was noticed surprisingly that emission control components with a zeolite coating have to be viewed as particularly critical in this regard. If the emission control system has an oxidation catalyst and/or a particle filter with a zeolite coating in addition to a zeolite SCR catalyst, the SCR catalyst typically has the higher HC storage capacity. A smoke emission due to desorption of previously stored HC can nonetheless be dominated by the oxidation catalyst and/or particle filter.

By means of the estimate of the HC storage amount carried out according to the invention, the risk of an HC desorption or smoke emission due to a heating of an emission control component with an ability for storing HC, particularly a correspondingly designed SCR catalyst, oxidation catalyst and/or particle filter in connection with a cold start or a warm-up of the internal combustion engine can also be estimated. If the HC storage amount in the emission control system exceeds the critical HC storage amount limit value altogether or in an emission control component dominant with regard to a smoke emission, the cold start engine operation method is activated. A heating of the emission control system or a dominant emission control component with regard to an HC adsorption takes place so early on the one hand that the smoke emission remains limited to predefined values. On the other hand, the cold start engine operation method permits adjustment of a heating speed of the emission control system or a dominant emission control component with regard to an HC adsorption in a defined manner so that the smoke emission remains limited to predefined values.

In an arrangement of the invention, values of internal combustion operating variables provided for an activated cold start engine operation method in such a manner that the at least one emission control component is heated by the exhaust gases discharged by the internal combustion engine in such a manner that a rate resulting due to the heating falls below a predefined desorption rate value. It was noticed that a fast heating of an emission control component charged with a stored HC can result in a quickly increasing desorption of HC, that is, a high desorption rate and thus a high smoke emission. This is particularly the case if a desorption temperature region of typically +50° C. to +250° C. is reached or passed through during the heating. Depending on the size of the HC storage amount, a greater or less high maximum concentration of HC in the exhaust gas is emitted to the environment. It is thereby particularly preferred if a predefined heating gradient maximum value for a heating gradient of the emission control system is fallen below in regard of a dominant emission control component smoke-causing HC desorption in a further arrangement of the invention. By means of the values of internal combustion engine variables adjusted in dependence on the HC storage amount and/or the temperature particularly on the emission control component dominant with regard to a smoke-causing HC desorption, the heating gradient and thus the desorption rate value or the HC maximum concentration can be influenced in a defined manner and preset or predefined limit values can be fallen below in a reliable manner. For example, a comparatively slow heating of less than about 10° C. per min, particularly in a temperature interval of −30° C. to +230° C., a soft HC desorption can be achieved, where a critical smoke emission peak is avoided. The adjustment of a low heating gradient is particularly advantageous, if an emission control component dominant with regard to a smoke-causing HC storage, as e.g. a zeolite oxidation catalyst, has a temperature just below or within the desorption temperature region. It is particularly advantageous, starting with low temperatures of the emission control component, that is, less than 0° C., particularly less than minus 20° C., to initially adjust a high heating gradient of about 20° C./min or more in a first heating step. The exposition duration of the emission control component in the temperature regime critical for an HC store is thereby shortened, a further store is largely avoided and the HC storage amount is thus limited. If a temperature just below the desorption temperature region, that is, below about 10° C. is reached, a low heating gradient below the heating gradient maximum value is adjusted. It is thereby advantageous to adjust the heating gradient in dependence on temperature, particularly with increasing temperature.

In a further arrangement of the invention, the estimate of the HC storage amount is based on an operation duration of the internal combustion engine with a temperature for a dominant emission control component dominant with regard to a smoke-causing HC desorption falling below a predefined temperature, particularly a first threshold temperature. Longer weak load operating times at low temperatures have proved especially critical. If, for example, the internal combustion engine is operated for a longer time in the idle run below a material-specific threshold temperature of typically about 30° C., emitted HC enrich increasingly in a respective emission control component enabled for HC adsorption. With multiple successive cold start and/or warm-up processes, where particularly this emission control component continuously has temperatures, where a storing of HC can take place, the respectively stored HC amounts accumulate. With a following, particularly fast heating due to an increasing internal combustion engine load, an undesired high HC desorption and smoke emission can result. According to the invention, this is met in that the HC storage amount over the operating time with HC storage is estimated at least integrating for an emission control component dominant for a smoke-causing HC desorption. If several emission control components with an HC storage capacity are present, the combined HC amount stored in the emission control system is preferably determined by estimation. If only one emission control component dominant with regard to an HC storage is present, it can be sufficient if the HC storage amount is only determined with this component. Due to the estimate of the HC storage amount provided according to the invention, the cold start engine operation method can already be activated before reaching a critical integral HC storage amount and a defined heating of the emission control system can be achieved. For estimating the HC storage amount, one preferably refers back to stored emission characteristic fields of the internal combustion engine and corresponding adsorption characteristic lines. An online calculation, based on an adsorption and desorption model, can also be provided for the relevant emission control components.

In a further arrangement of the invention a fraction of an HC storage capacity of the at least one emission control component or an emission control component dominant with regard to a smoke-causing HC desorption is preset as HC storage amount limit value. The HC storage capacity as an HC amount that can maximally be stored is typically highly dependent on the temperature of a respective emission control component and additionally on its type and/or ageing state. The HC storage capacity is conveniently determined empirically beforehand for all emission control components relevant for an HC adsorption and is stored in a control device. An ageing dependence can thereby be considered in addition to a temperature dependence. For an SCR catalyst of the iron or zeolite type, the HC storage capacity is typically in the region of 1 g to 30 g per l catalyst volume at low temperatures of 0° C. and less. By means of the orientation of the HC storage amount limit value provided according to the invention as the HC storage capacity determined in such a manner, an undesired high load of the SCR catalyst or of another emission control component relevant with regard to this is avoided. It is thereby particularly advantageous if the fraction of the HC storage capacity is given in dependence on temperature, particularly decreasing with a decreasing temperature of the corresponding emission control component(s).

In a further arrangement of the invention, the cold start engine operation method is deactivated after reaching a predefined second threshold temperature for at least one of the emission control components or an emission control component dominant with regard of a smoke-causing HC desorption. The inventors have recognized that a storage of HC in zeolite-containing emission control components above a typically catalyst-specific threshold temperature is low or even negligible, wherein possibly stored HC can already desorb below this temperature almost completely. If the cold start engine operation method is deactivated as fast as possible after reaching the threshold temperature, excess fuel consumption is thereby also avoided or at least limited. If the engine load required by the user exceeds a predefined minimum value, where it is ensured that a further heating or at least no cooling takes place, the cold start engine operation method is preferably deactivated immediately after reaching the threshold temperature. In the other case, this can stay activated for a certain time. It is particularly advantageous in this connection to apply the exact time of the deactivation depending on the engine load. A sensor can also be provided to sense an HC desorption and to deactivate the activated cold start engine operation method by terminating some of all measures taken thereby after exceeding a detected HC desorption maximum.

In a further arrangement of the invention, a multiple injection of fuel into one or several cylinder combustion chambers of the internal combustion engine is carried out with an activated cold start engine operation method, which comprises a first pilot injection, a second pilot injection following the first pilot injection and a main injection following the second pilot injection within a work cycle of the respective cylinder. It can thereby be provided to divide the first and/or the second pilot injection into two individual injections following each other quickly. By means of the at least two pilot injections preceding the main injection, an ignition of the injected fuel is also enabled with low engine temperatures below the freezing point. Preferably, a comparatively low fuel amount of about 20% or less with regard to the main injection amount is injected in the first or in the second pilot injection. In this manner, an ignition is achieved even at very low surrounding or engine temperatures of minus 20° C. or less. Due to the low pilot injection amount, a temperature decrease caused by evaporation is at least reduced and an ignition of the homogenized pilot injection amount is improved.

It is particularly preferred if the first pilot injection takes place in a crankshaft angle region of larger than 20 degrees before an upper dead center in the compression cycle of the respective cylinder in a further arrangement of the invention. Typically, the temperature in the cylinder is too low for a conventional diffusion combustion at low temperatures of minus 20° C. or less. With the early pilot injection according to the invention, a homogenization of the mixture is enabled, whereby the ignitibility is improved. A combustion conversion of the first pilot injection takes place with a corresponding ignition delay, which leads to an increase of the temperature level in the cylinder. The fuel amount introduced with the second pilot injection can thus evaporate quickly and also ignite.

In a further arrangement of the invention, the second pilot injection takes place at a time after the start of a conversion of fuel injected by the first pilot injection. By means of the choice of the time for the second pilot injection according to the invention, the combustion progress for the fuel of the second pilot injection and the following main injection is improved.

A further improvement of the combustion progress is enabled, if the main injection takes place at a time after the start of a conversion releasing heat by fuel injected by the second pilot injection in a further arrangement of the invention. A safe ignition is thereby ensured even with very low temperatures. In this manner, HC emissions can also be kept comparatively low even with very low outer temperatures and a defined heating of the emission control system is enabled. The main injection typically only takes place behind the upper dead center of the compression cycle, particularly only after about 10 degrees crank angle behind the upper dead center. A late combustion position or a late position of the combustion center of mass thereby results. This enables a safe ignition and a defined and quick heating of the emission control system and thus the preferably provided zeolite-containing SCR catalyst. A NO formation caused by combustion is additionally reduced.

In a further arrangement of the invention, the implementation of the cold engine operation method takes place in a predefined low load region of the internal combustion engine and the cold engine operation is deactivated with an internal combustion engine load above the low load region. After the deactivation of the cold start engine operation method, a combustion method with a dominating diffusion combustion is preferably adjusted.

BRIEF DESCRIPTION OF THE DRAWING FIGURES

Advantageous embodiments of the invention are illustrated in the drawings and are described in the following. It is obvious that the above-mentioned characteristics and which still will be explained in the following cannot only be used in the respectively given combination but also in other combinations or on their own without leaving the scope of the present invention.

It shows thereby.

DETAILED DESCRIPTION

Figure 1:
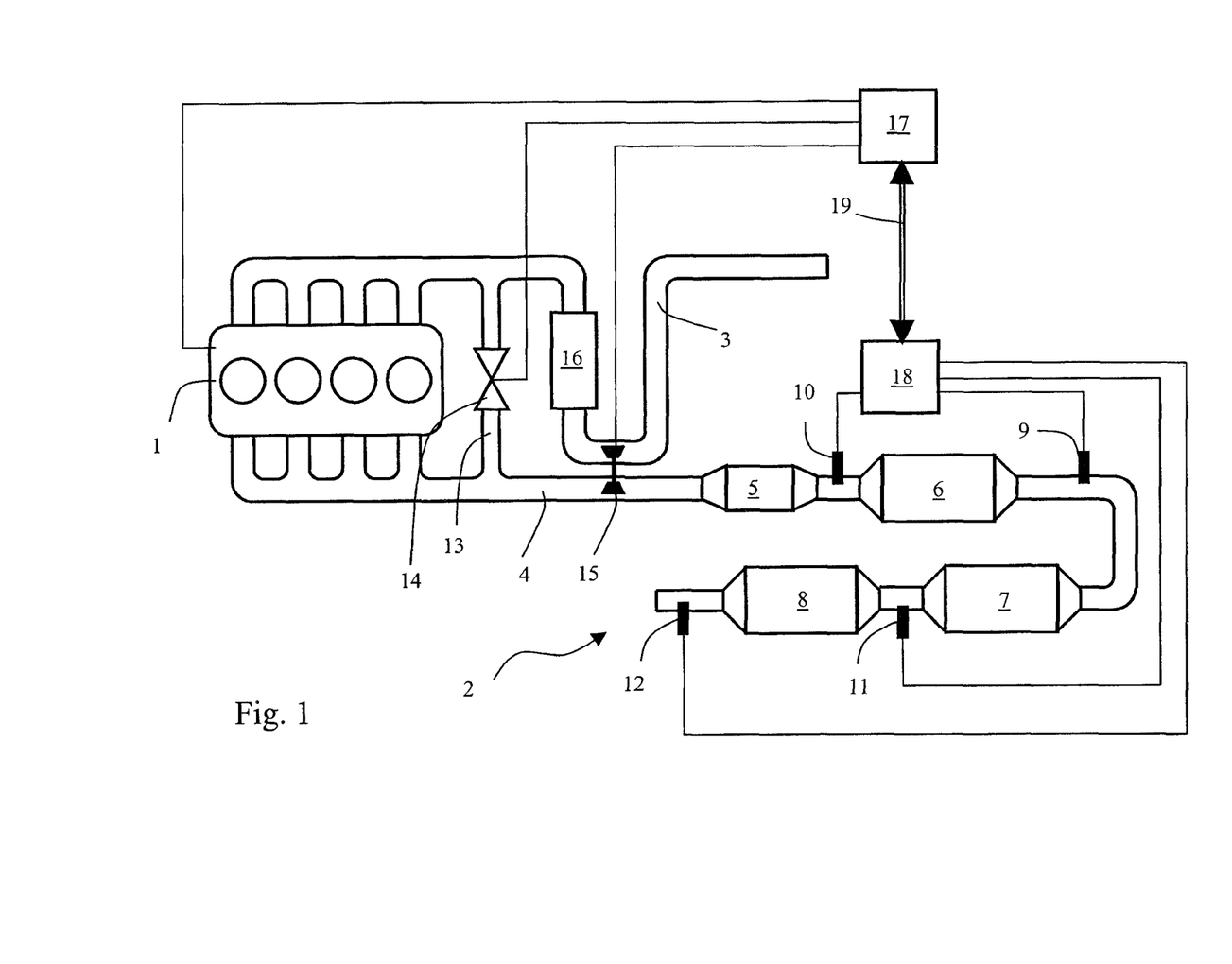
FIG. 1 an internal combustion engine with an emission control system with exhaust gas catalysts and a particle filter in a schematic view, FIG. 2 a diagram with a schematic depiction of the temperature dependence of an HC storage capacity of a typical zeolite SCR catalyst, and FIG. 3 a diagram with a schematic depiction of a heat release into a cylinder of the Diesel engine and actuation pulses $I_{injek}$ of the corresponding fuel injector in dependence on time.

FIG. 1 schematically shows an advantageous embodiment of a system of an internal combustion engine 1 and an emission control system 2 for a motor vehicle (not shown). The internal combustion engine 1 is a directly injecting air-compressing internal combustion engine according to the piston principle, called Diesel engine. An assigned fuel injection system (not shown) is preferably designed as a so-called common rail system with an adjustable rail pressure or fuel injection pressure.

A combustion chamber with one or two inlet and outlet valves, a glow plug and a fuel injector and one or several inlet channels for the combustion air are respectively assigned to the cylinders of the Diesel engine 1, which is not shown in detail. The fuel injectors are thereby provided with adjustable injection amounts for carrying out multiple injections. The inlet and outlet valves can preferably be operated with adjustable control times and adjustable opening lift.

The Diesel engine 1 obtains its combustion air via an air supply line 3, in which an air mass meter (not shown) is arranged. By means of an adjustable throttle element in the air supply line, also not shown, the air mass flow supplied to the Diesel engine 1 can be throttled to an adjustable measure. The combustion air is compressed by means of an exhaust gas turbocharger 15 and supplied to a charge-air cooler 16 for cooling. Preferably, component(s) for lifting the temperature level, not shown in detail, of the combustion air supplied to the Diesel engine are provided, particularly in connection with a cold start or warm-up. A bypass of the charge-air cooler 16 is preferably provided as required. For the active lift of the combustion air temperature, a heating device can be provided in the air supply line. An active heating by means of a so-called grid heater is particularly preferred, which is preferably arranged in an exhaust gas return line 13 before its feed into the air supply line 3. The exhaust gas turbocharger 15 is preferably designed as a so-called VTG charger or as a waste gate charger with adjustable charge pressure.

Exhaust gas generated in the combustion chambers of the cylinders of the Diesel engine 1 is emitted via an exhaust gas line 4. Thereby, exhaust gas can be admixed to the combustion air via the exhaust gas return line and thus be returned to the Diesel engine 1. The part of the returned exhaust gas (AGR rate) can be adjusted via an AGR valve 14. The exhaust gas returned to the Diesel engine is preferably cooled by an AGR cooler (not shown) wherein a possibly adjustable bypass can be provided for the AGR cooler. Thereby, cooled, hot or heated exhaust gas can optionally be admixed to the combustion air. Exhaust gas that has not been returned is supplied to the emission control system via the exhaust gas turbocharger 15. Furthermore, an adjustable throttle element, not shown, is preferably provided in the exhaust gas line 4 downstream of the exhaust gas turbocharger 15.

With the described preferred embodiment different values for the essential engine operation parameters as, e.g., air mass flow, injection time, amount pressure and time of different fuel injections, AGR rate, charge-air pressure, cylinder filling and thus different combustion methods can be represented according to requirement. A further enlargement of the variability can be provided in the form of an adjustable compression ratio.

A preferred embodiment of the emission control system 2 assigned to the Diesel engine 1 comprises, seen in the flow direction of the exhaust gas, in this sequence a first oxidation catalyst 5, a second oxidation catalyst 6, a particle filter 7 and an SCR catalyst 8. A so-called wallflow filter based on SiC, cordierite or aluminum titanate is preferably used. The particle filter can, however, also be formed as a sinter metal filter or as a filter unit with an open filter structure. The catalysts 5, 6, 8 are preferably designed as honeycomb monoliths, which are passed through by catalytically coated channels, through which the supplied exhaust gas can flow. The SCR catalyst is preferably designed as a coated support catalyst with a copper- or iron-containing zeolite coating. Due to this embodiment, the SCR catalyst 8 can store exhaust gas components, particularly HC, NOx and $NH_3$. The essential property is, however, to be able to catalyze a selective reduction of NOx to $N_2$ by means of stored or supplied $NH_3$ as reaction partner under oxidizing conditions. A supply of $NH_3$ preferably takes place via a dosing device, not shown, via which a solution containing urea can be injected into the exhaust gas upstream of the SCR catalyst 8. Urea injected into the exhaust gas thereby breaks down with a release of $NH_3$.

On the input side of the first oxidation catalyst 5 and/or the second oxidation catalyst 6, a fuel supply unit can be provided, via which fuel can be supplied to the exhaust gas as fuel. This enables an enrichment of the exhaust gas with fuel or HC. Due to the exothermal oxidation of fuel supplied to the exhaust gas according to a requirement, a defined heating of the exhaust gas, for example in connection with an active regeneration of the particle filter 7 is enabled by thermal soot combustion.

Different temperature and exhaust gas sensors for sensing exhaust gas and component temperatures and of concentrations of important exhaust gas components are provided in the exhaust gas aftertreatment device 2. For example, one temperature sensor 10, 11 is respectively arranged in the emission control system 2 in FIG. 1 on the input side of the second oxidation catalyst 6 and on the output side of the particle filter 7. On the output side of the second oxidation catalyst 6 and of the SCR catalyst 8 are provided gas sensors 9, 12 sensitive with regard to NOx and/or NH$_3$. For determining the loading of the particle filter 7 with soot and/or ash, it is additionally preferred to provide pressure sensors or a differential pressure sensor on the input and output side of the particle filter 7, as is not specially shown in FIG. 1. By means of these and possibly further sensors, the operating state of the emission control system 2 can be determined comprehensively and the operation of the Diesel engine 1 can possibly be adapted.

For adjusting or for sensing the engine operation, an electronic engine control device 17 is provided. The engine control device obtains information about relevant engine operating variables e.g., speed, engine load, temperatures pressures, from the respective sensors or detectors and can on emit control signals as adjustment variables to actuators e.g., to the AGR valve 14, the exhaust gas turbocharger 15 or the throttle element in the air supply line 3. A regulation ability of operating or state variables of the gas supply side and of the fuel supply side is provided. The engine control device 17 has the ability to actuate the fuel injectors for carrying out multiple injections and possibly to adjust the fuel injection pressure according to requirement. The engine control device 17 is further equipped for carrying out regulation and control processes, with which engine operating variables are adjusted in a regulated or controlled manner. The engine control device 17 can fall back to stored characteristic fields or calculation or regulation or control routines for this. Sub-systems provided for this, such as calculators, stores or input-output units and the like are not represented separately.

In an analogous manner, a second control device 18 is provided for sensing and adjusting operation and state variables of the exhaust gas aftertreatment device 2. The engine control device 17 and the second control device 18 are connected to each other by means of a bi-directional data line 19, which enables a mutual exchange of data available by a respective control device. It is obvious that the control devices 17, 18 can also be combined in a single integral measuring sensing and control unit.

In the shown preferred embodiment, an optimum operation of the Diesel engine 1 and a comprehensive cleaning of the exhaust gases emitted thereby are enabled. A desired emission control is, however, only enabled if the exhaust gas catalysts 5, 6, 8 are at their operating temperature. Below a so-called start-up temperature, a reduced or missing catalytic activity is given, where, particularly in connection with a cold start or a warm-up, special measures are necessary, in order to avoid or to at least reduce an undesired contaminant emission to the environment. In the following, a reduction of the emission of hydrocarbons (HC) at temperatures below a start-up temperature of the SCR catalyst 8 is discussed. The measures mentioned in the following particularly relate to a reduction of the white smoke emission formed by HC with surrounding temperatures below or near the freezing point or at temperatures of the exhaust gas catalysts 5, 6, 8 or of the particle filter 7 below a threshold temperature specific for an adsorption of HC or desorption of HC.

Even though, depending on the type of the catalytic coating of the exhaust gas catalysts 5, 6, 8 or of the particle filter 7, each of these emission control components can have an HC adsorption capability particularly at low temperatures and thus can at least also be responsible for a white smoke emission due to an HC desorption occurring at higher temperatures, it is assumed in the following that HC adsorption and desorption effects occur in the first instance at the SCR catalyst 8 and a possibly occurring white smoke emission is thus caused dominantly by the SCR catalyst 8. The measures for avoiding an undesired HC emission, especially from the SCR catalyst 8, discussed below can, however, analogously also be used with regard to one or several of the other emission control components 5, 6, 7.

Typically, an increasing adsorption capability of HC achieved with a decreasing temperature. The maximum HC amount that can be received is thereby called HC storage capacity.

Figure 2:
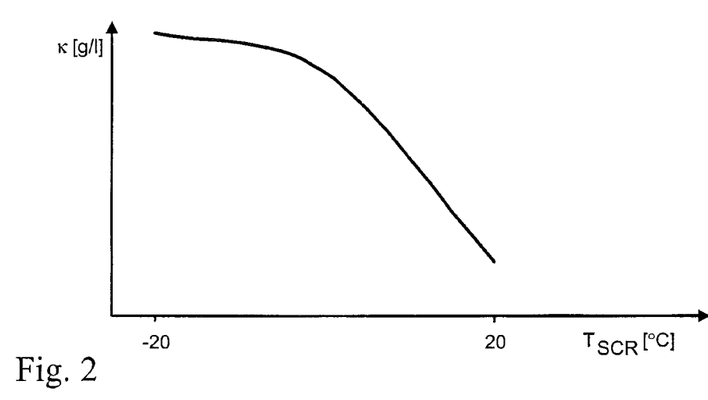

The diagram of FIG. 2 shows the temperature dependence of the HC storage capacity $\kappa$ of a typical SCR catalyst on the basis of zeolite. As can be seen, the HC storage capacity $\kappa$, that is, the amount of HC that can be stored in the SCR catalyst increases with decreasing temperature $T_{SCR}$. Thereby, an increasing saturation behavior is noted with decreasing temperatures. Even though the temperature dependence of the HC storage capacity $\kappa$ can be formed differently depending on the type and extent of the catalytic zeolite coating, values in the region of 0.5 to 30 grams HC per liter catalyst volume, particularly from 1 to 20 g/l are to be viewed as typical for the HC storage capacity $\kappa$ in the temperature region of +100 to minus 20° C. Maximum values of about 20 g/l are particularly characteristic for customary catalyst designs with temperatures of $T_{SCR}$<15° C. Above a catalyst-specific threshold temperature of about +30° C. to +150° C., particularly of about +100° C., the HC storage capacity $\kappa$ can typically be neglected. From a second threshold temperature slightly above, increasing desorption occurrences result with increasing temperature. For zeolite coatings conventionally used with oxidation catalysts or particle filters, the threshold temperatures are preferably set as lower. The HC storage capacity $\kappa$ can here often be neglected above about 50° C. More or less high desorption occurrences thereby typically occur from 60° C. to 80° C.

The HC storage capacity $\kappa$ verified by the inventors results in that, with an engine operation, where the SCR catalyst 8 falls below the threshold temperature, HC present in the exhaust gases are stored to a more or less extent. Corresponding engine operating states comprise, for example, one or several successive cold start processes, to which can respectively connect low load phases or warm-up phases. If a higher load is required by the Diesel engine 1 after these engine operating states, a heating of the SCR catalyst 8 occurs due to the more heated exhaust gas, which can lead to an undesired desorption of previously stored HC. Desorbing HC are thereby perceived as white smoke from a limit concentration. The inventors have noticed that the extent of the HC desorption is dependent on the HC amount stored in the SCR catalyst 8 and on the heating speed of the SCR catalyst 8 in a relevant manner.

With the corresponding experiments it was noticed that desorption peaks occur in a characteristic desorption temperature region of the corresponding emission control component, which peaks have an increasing height with an increasing HC storage amount. Even though the desorption temperature region is dependent on the type of the catalytic zeolite coating, values in the region of +50° C. to +150° C., particularly from +50 to +150° C. are to be viewed as typical for the occurrence of the HC desorption maximum. It was further noticed that the HC desorption rate or the height and width of the HC desorption peak depends on the heating speed, that is, on the size of the heating gradient. With a heating, HC desorption peaks occur in a characteristic desorption temperature region, which peaks have an increasing height and a decreasing width with an increasing heating gradient.

Due to the results determined in corresponding basic experiments, strategies for avoiding an undesirably high HC release with a cold start or a warm-up of the Diesel engine were developed, which according to the invention are directed to limit a storage of HC in the SCR catalyst 8 with regard to amount. This is achieved in that an estimate of the amount of HC stored in the SCR catalyst takes place and a defined heating of the SCR catalyst 8 by means of correspondingly heated exhaust gas is performed, if the estimate results in the HC storage amount exceeding a predefined HC storage amount limit value. In this manner, a storage of critically high HC amounts is avoided and a desorption of HC stored in the SCR catalyst 8 is forced at a time before the HC storage amount reaches such a critical level that a heating occurring later would result in undesirably high HC desorption peaks. On the other hand, heating measures explained in more detail in the following are carried out in such a manner that a predefined desorption rate value for a rate resulting due to the heating of the SCR catalyst 8 of HC desorbing from the SCR catalyst 8 or a predefined maximum concentration of HC in the exhaust gas emitted to the environment is fallen below.

For estimating the HC storage amount in the SCR catalyst 8, it is provided according to the invention to detect the number of successive cold start and warm-up processes, where a predefined threshold temperature for the SCR catalyst 8 is fallen below continuously or at least predominantly. The HC amount emitted thereby by the Diesel engine 1 and stored in the emission control system 2 or in the SCR catalyst 8 is also determined. For this, one preferably refers to stored emission characteristic fields of the Diesel engine 1, in which values for the HC raw emission are stored in dependence on relevant engine operation parameters. In connection with adsorption and desorption characteristic lines also stored, a summing of HC amounts stored is enabled in respective cold start and warm-up processes in the SCR catalyst. If the estimate results in the HC storage amount exceeding an HC storage amount limit value, which particularly exceeds a storage amount limit value, which exceeds a fraction of an HC storage capacity κ of the SCR catalyst 8 predefined in particular in dependence on the temperature of the SCR catalyst 8 and/or the exhaust gas throughput, heating measures are activated, which are preferably controlled in such a manner that the temperature falls below a predefined heating gradient maximum value for a heating gradient of the SCR catalyst 8, particularly in or closely below the desorption temperature region. The heating gradient maximum value is preferably fixed in dependence on the HC storage amount and/or the temperature of the SCR catalyst 8 in such a manner that the HC maximum concentration falls below a predefined value in the exhaust gas emitted to the environment. This value for the HC maximum concentration preferably corresponds to a visibility limit of white smoke. Typical values for the HC storage amount limit value are about 10% to 30% of the HC storage capacity κ. Typical values for the heating gradient maximum value are about 5 to 20° C. per min.

According to the invention, several normally adjusted engine operation variables are changed in such a manner for a defined heating of the SCR catalyst 8 with a cold start and/or with a subsequent warm-up, that a hotter exhaust gas results compared to the normal operation. Preferably, one or more of the following measures are applied in a method designated as cold start engine operation method in the following:

closing the throttle element arranged in the exhaust gas line 4 corresponding to a reduction of the free flow-through cross section by 10% to 95%, particularly depending on load, with a higher throttling at a low load. A closure of the throttle element in such a manner is particularly preferred in that a retention pressure of 1 bar to 4 bar, particularly of 2 bar to 3 bar results.

closing the throttle element arranged in the air supply line 3 corresponding to a reduction of the free flow-through cross section by 10% to 95%, preferably 30% to 70%.

reducing the charging pressure supplied by the exhaust gas turbocharger, possibly up to reaching the running limit or a predefined soot limit, preferably corresponding to a blackening number of 1 or higher.

actuating the grid heater in the AGR line.

changing the control time of the outlet valves of one or several cylinders of the Diesel engine 1 in such a manner that the outlet valve opens in the region of 10° KWnOT to 75° KWnOT, preferably 40° KWnOT to 65° KWnOT.

closing the AGR valve 14, preferably completely at least temporarily, on request temporarily or opening gradually until an opening degree applied for the normal operation.

carrying out a first pilot injection, a second pilot injection following the first pilot injection and a main injection following the second pilot injection of fuel into the cylinders of the Diesel engine in such a manner that a center of mass position of the fuel combustion results after the dead center of the compression cycle.

With low outer temperatures −10° C. or less, it is particularly preferred if a special adjustment of fuel injection parameters takes place for a cold start and a warm-up or cold-run phase connected thereto corresponding to the last-mentioned point, as explained in more detail in the following with reference to the diagram shown in FIG. 3.

Figure 3:
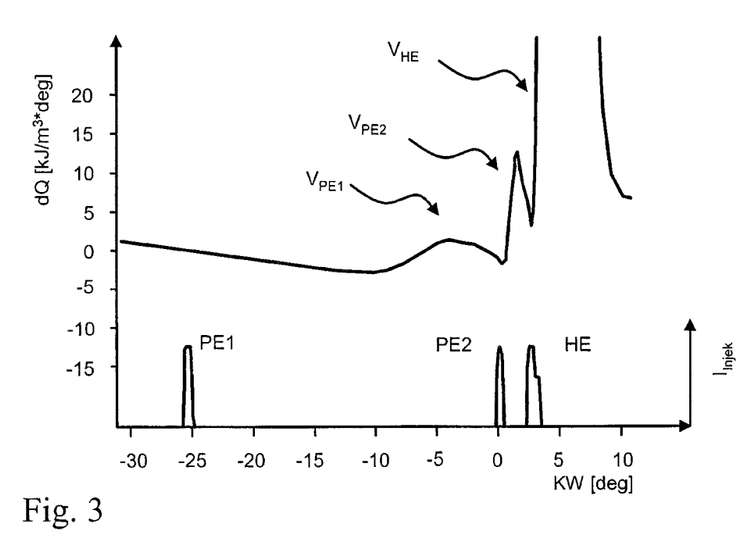

In the diagram of FIG. 3, a heat release dQ in a cylinder of the Diesel engine 1 is shown schematically in the upper part and actuation pulses $I_{injek}$ of the corresponding fuel injector in dependence on time, re-standardized to degree crank angle KW in the lower part.

The cold start engine operation method with correspondingly chosen injection parameters according to the invention is designed as a partial homogeneous combustion method with at least two pilot injections PE1, PE2 and at least one main injection HE of fuel into the combustion chambers of the Diesel engine. The first pilot injection PE1 thereby preferably takes place in the compression cycle at an early time, so that a mainly homogeneous ignitable air fuel mixture results during the further course of the compression cycle and a homogeneous combustion of the homogeneous mixture with a heat release after a certain ignition delay, characterized by the arrow designated with $V_{PE1}$.

The second pilot injection PE2 preferably takes place approximately at the upper dead center of the compression cycle at a time where a clear temperature increase has occurred in the combustion chamber due to the combustion of the previously injected fuel amount of the first pilot injection PE1. The main injection takes place offset to the second pilot injection analogous to a time, where a further distinct heat release, characterized by the arrow designated with $V_{PE2}$ has occurred in the combustion chamber due to the combustion of the previously injected second pilot injection PE2. An ignition of the injected fuel is ensured in this manner even with very low temperatures of −20° C. and less.

The combustion of the main injection HE preferably takes place in a conventional diffusion combustion. It can thereby be provided to divide the main injection HE into several partial injections in such a manner that a scaled combustion results. It is thereby particularly preferred if the injection amount of each partial injection of the main injection HE is adjusted to be larger than the injection amount of the previous partial injection.

The first pilot injection PE1 preferably takes place in a crank angle region of 20° KWvOT to 40° KWvOT. The injection amount of the first pilot injection PE1 is thereby preferably chosen approximately in the region of 5% to 25% of the injection amount of the main injection HE. The second pilot injection PE2 preferably takes place in the region of the upper dead center in a crank angle region of 5° KWvOT to 5° KWnOT, but at the earliest after the ignition of the fuel injected with the first pilot injection PE1. The injection amount of the second pilot injection PE2 is thereby preferably chosen approximately in the region of 2% to 15% of the injection amount of the main injection HE.

Deviating from the representation shown in FIG. 3, the injection start of the main injection HE is typically chosen in a crank angle region of 5° KWnOT to 20° KWnOT, so that a comparatively late combustion position results. The emission heating can thereby be adjusted in a defined manner with a time of the actuation start for the fuel injector, so that the intended heating rate of the SCR catalyst 8 can be achieved in a reliable manner. With a division of the main injection HE into two partial injections possibly carried out, the second partial injection takes place abutting the first partial injection in a crank angle region of 25° KWnOT to 60° KWnOT. Thereby, a comparatively late position of the combustion center of mass results with about 20° KWnOT, whereby a defined heating of the emission control system 2 and of the SCR catalyst 8 is enabled. A further displacement too late of the combustion center of mass is preferably provided with an increasing engine load.

With the cold start engine operation method according to the invention, a defined heating of the emission control components 5, 6, 7, 8 of the emission control system 2 and especially of the SCR catalyst 8 is enabled even with very low temperatures and low engine loads. A heating for avoiding undesirably high desorption peaks is thereby also enabled independently of the adjustment of certain vehicle states. According to the invention, it is provided to deactivate the cold start engine operation method when reaching a predefined threshold temperature for the SCR catalyst 8 or the emission control component dominant with regard to an HC desorption causing smoke. A deactivation is thereby meant to be the terminating of at least one part of the above-mentioned measures. A limitation of an excess fuel consumption caused by the cold start engine operation is thereby enabled. A deactivation of the cold start engine operation method is also provided if the engine load exceeds a preset or predefined limit value of about 30% of the nominal load. In this case, a natural heating of the emission control system 2 and of the SCR catalyst 8 often takes place in any case.

The invention claimed is:

1. A method for operating an internal combustion engine with an exhaust gas cleaning system that includes at least one catalytic or filter-effective exhaust gas cleaning component, where, in connection with a cold start or a warm-up of the internal combustion engine, the internal combustion engine is operated with a cold start engine operation method for heating up the exhaust gas cleaning component, the cold start engine operation method having predefined values for predefined internal combustion operation variables, comprising:

estimating an HC storage amount of hydrocarbons stored in one or more of the at least one exhaust gas cleaning component; and activating the cold start engine operation method when the estimate indicates that the HC storage amount exceeds a predefined HC storage amount limit value, wherein the cold start engine operation method comprises controlling operation of the internal combustion engine using predefined values for internal combustion engine operation variables to produce heated exhaust gas, providing the heated exhaust gas to the at least one exhaust gas cleaning component, wherein the at least one exhaust gas cleaning component is heated by the heated exhaust gas, wherein predefined values for the internal combustion engine operation variables produce a heating gradient of the heating of the at least one exhaust gas cleaning component in a predefined desorption temperature range that falls below a predefined heating gradient maximum value, and wherein the predefined desorption temperature range is where a desorption of hydrocarbons stored in the exhaust gas cleaning component takes place and is below a start-up temperature of the heated at least one exhaust gas cleaning component.

2. The method according to claim 1, wherein the cold start engine operation method is activated with a cold start with outer temperatures of minus 10° C. or less.

3. The method according to claim 1, wherein the heating gradient is less than 20° C. per minute in a desorption temperature range of 50° C. to 150° C.

4. The method according to claim 1, wherein the heating gradient maximum value results in an emission concentration of hydrocarbons emitted to the environment that is below a maximum concentration of hydrocarbons, wherein the maximum concentration of hydrocarbons corresponds to a concentration below a concentration that produces visible white smoke.

5. The method according to claim 1, wherein the estimate of the HC storage amount is based on an operation duration of the internal combustion engine with a temperature continuously falling below a predefined first threshold temperature for at least one exhaust gas cleaning component that is dominant with regard to a smoke-causing HC desorption.

6. The method according to claim 1, wherein a fraction of an HC storage capacity (κ) of the at least one exhaust gas cleaning component or an exhaust gas cleaning component being dominant with regard to a smoke-causing HC desorption is predefined as HC storage amount limit value.

7. The method according to claim 6, wherein a value of 30% or less is predefined as the fraction of the HC storage capacity (κ).

8. The method according to claim 1, wherein the cold start engine operation method is deactivated after reaching a predefined second threshold temperature for at least one of the exhaust gas cleaning components or an exhaust gas cleaning component being dominant with regard to a smoke-causing HC desorption.

9. The method according to claim 4, wherein the cold start engine operation method is deactivated after reaching a predefined second threshold temperature for at least one of the exhaust gas cleaning components or an exhaust gas cleaning component being dominant with regard to a smoke-causing HC desorption.

10. The method according to claim 5, wherein the cold start engine operation method is deactivated after reaching a predefined second threshold temperature for at least one of the exhaust gas cleaning components or an exhaust gas cleaning component being dominant with regard to a smoke-causing HC desorption.

11. The method according to claim 1, wherein a multiple injection of fuel into one or several cylinder combustion chambers of the internal combustion engine is performed with an activated cold start engine operation method that comprises a first pilot injection, a second pilot injection following the first pilot injection and a main injection following the second pilot injection within one working cycle of the respective cylinder, wherein
 the first pilot injection occurs in a crank angle range of larger than 20 degrees before an upper dead center in a compression stroke of the respective cylinder,
 the second pilot injection occurs at a point after the start of a heat releasing conversion of fuel injected by the first pilot injection, and
 the main injection occurs at a point after the start of a heat releasing conversion of fuel injected by the second pilot injection.

12. The method according to claim 8, wherein a multiple injection of fuel into one or several cylinder combustion chambers of the internal combustion engine is performed with an activated cold start engine operation method that comprises a first pilot injection, a second pilot injection following the first pilot injection and a main injection following the second pilot injection within one working cycle of the respective cylinder, wherein
 the first pilot injection occurs in a crank angle range of larger than 20 degrees before an upper dead center in a compression stroke of the respective cylinder,
 the second pilot injection occurs at a point after the start of a heat releasing conversion of fuel injected by the first pilot injection, and
 the main injection occurs at a point after the start of a heat releasing conversion of fuel injected by the second pilot injection.

13. The method according to claim 9, wherein a multiple injection of fuel into one or several cylinder combustion chambers of the internal combustion engine is performed with an activated cold start engine operation method that comprises a first pilot injection, a second pilot injection following the first pilot injection and a main injection following the second pilot injection within one working cycle of the respective cylinder, wherein
 the first pilot injection occurs in a crank angle range of larger than 20 degrees before an upper dead center in a compression stroke of the respective cylinder,
 the second pilot injection occurs at a point after the start of a heat releasing conversion of fuel injected by the first pilot injection, and
 the main injection occurs at a point after the start of a heat releasing conversion of fuel injected by the second pilot injection.

14. The method according to claim 10, wherein a multiple injection of fuel into one or several cylinder combustion chambers of the internal combustion engine is performed with an activated cold start engine operation method that comprises a first pilot injection, a second pilot injection following the first pilot injection and a main injection following the second pilot injection within one working cycle of the respective cylinder, wherein
 the first pilot injection occurs in a crank angle range of larger than 20 degrees before an upper dead center in a compression stroke of the respective cylinder,
 the second pilot injection occurs at a point after the start of a heat releasing conversion of fuel injected by the first pilot injection, and
 the main injection occurs at a point after the start of a heat releasing conversion of fuel injected by the second pilot injection.

15. The method according to claim 11, wherein the second pilot injection occurs in a crank angle range of 5 degrees before to 5 degrees after the upper dead center of the compression stroke.

16. The method according to claim 11, wherein
 an injection amount of the second pilot injection is chosen smaller than the injection amount of the first pilot injection.

17. The method according to claim 1, wherein implementation of the cold start engine operation method occurs in a predefined low load region of the internal combustion engine and the cold start engine operation method is deactivated with an internal combustion engine load above the low load region.

18. The method according to claim 11, wherein implementation of the cold start engine operation method occurs in a predefined low load region of the internal combustion engine and the cold start engine operation method is deactivated with an internal combustion engine load above the low load region.

19. The method according to claim 1, wherein the estimate of the HC storage amount is performed with a SCR catalyst as a catalytic exhaust gas cleaning component of the exhaust gas cleaning system and the cold start engine operation is activated when the estimate results in the HC storage amount of the SCR catalyst exceeding the predefined HC storage amount limit value.

20. The method according to claim 11, wherein the estimate of the HC storage amount is performed with a SCR catalyst as a catalytic exhaust gas cleaning component of the exhaust gas cleaning system and the cold start engine operation is activated when the estimate results in the HC storage amount of the SCR catalyst exceeding the predefined HC storage amount limit value.

* * * * *